Patented Oct. 6, 1931

1,825,740

UNITED STATES PATENT OFFICE

GEORG KRÄNZLEIN, HEINRICH VOLLMANN, AND MARTIN CORELL, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

VAT DYESTUFFS AND PROCESS OF PREPARING THEM

No Drawing. Application filed February 25, 1929, Serial No. 342,661, and in Germany March 23, 1928.

The present invention relates to vat dyestuffs and process of preparing them.

We have found that new and very valuable vat dyestuffs dyeing different tints are obtainable by causing halogen dibenzpyrenquinones, containing at least one halogen in the molecule and having the following general formula:

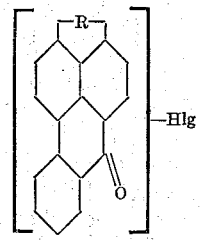

wherein R stands for the bivalent residue

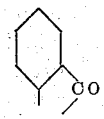

to act upon nitrogen-containing compounds, having at least one exchangeable hydrogen atom, of the following general formula: $R_2$—NH—$R_1$ wherein $R_1$ stands for hydrogen or a monovalent organic residue, $R_2$ stands for a substituted or non-substituted aromatic residue or $R_1$ and $R_2$ together stand for a phthaloyl-residue.

The reaction is carried out in the presence of a solvent as for instance nitrobenzene, orthocresol, naphthalene, quino-line, while adding an acid-binding agent as for instance sodium acetate, sodium carbonate or the like, furthermore in the presence of a copper-catalyst as for instance copper powder, copper oxide and copper salts as for instance copper chloride or copper acetate.

The products thus obtainable are compounds of the following general formula:

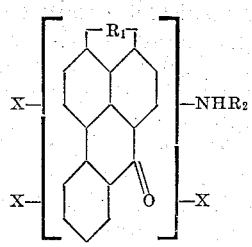

wherein $R_1$ stands for the bivalent residue

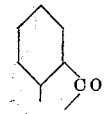

$R_2$ for aryl or aroyl, X for hydrogen or $NH.R_2$.

As representative compounds falling within the scope of this general formula there may be mentioned, for instance, compounds of the following formula:

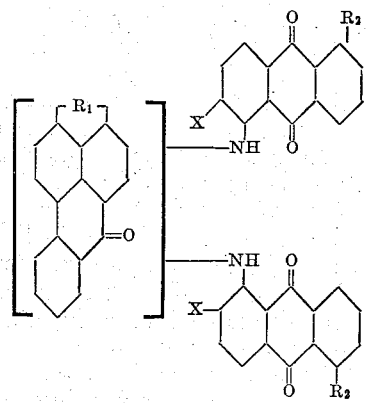

wherein $R_1$ stands for the bivalent residue

$R_2$ represents hydrogen or NH. benzoyl, and X stands for hydrogen, the COOH or the CHO group.

Structural formulæ of other compounds are given in the following specific examples.

Tints and fastness properties of the substances prepared according to the above described process may be changed by treating them with an acid condensing agent, such as aluminium chloride, sulfuric acid, chlorosulfonic acid, the condensation being carried out if required in the presence of a melting agent as for instance sodium chloride.

The following examples serve to illustrate our invention but they are not intended to limit it thereto, the parts being by weight.

1. 82 parts of monobromisodibenzpyrenquinone, obtainable by treating 2-(para-bromobenzoyl)-benzanthrone with aluminium chloride while passing oxygen into the melt, are heated to boiling temperature for about 5 hours with a mixture of 45 parts of α-aminoanthraquinone, 20 parts of sodium acetate, and 7 parts of copper acetate in 1500 parts of nitrobenzene. The conversion-product separating in a crystalline form while the mass is boiling, is filtered by suction. It has the following probable formula:

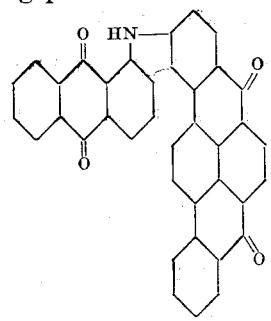

It forms a dark-violet powder which dissolves in concentrated sulfuric acid to a yellowish-green solution. The dyestuff dyes cotton from an orange-red vat dull red tints.

By treating the reaction product thus obtained at about 130° C. for half an hour with ten times its weight of sodium-aluminium chloride, there is obtained after decomposition of the melt a dyestuff which dyes cotton from a red vat reddish-brown tints of a good fastness to washing and chlorine.

2. 40 parts of monobromisodibenzpyrenquinone, obtainable as indicated in Example 1, are heated to boiling temperature for some hours with 15 parts of anthranilic acid, 5 parts of anhydrous sodium carbonate and 2 parts of copper acetate in 600 parts of ortho-cresol. The new compound isolated from the mass as described in the preceding example dissolves in concentrated sulfuric acid to a pure yellowish-green solution and dyes from a yellowish-red vat claret-red tints. It has the following probable formula:

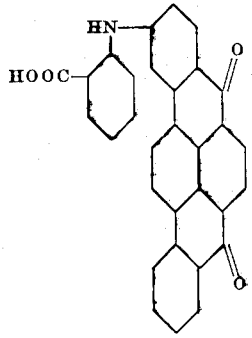

By heating the green solution in concentrated sulfuric acid to a temperature of from 90° C. to 100° C. for a short time, the coloration of the solution turns brown. The dyestuff precipitating by pouring the solution into water dyes from an orange vat brownish-orange tints.

3. By boiling for several hours 100 parts of dibromisodibenzpyrenquinone, obtainable by treating isodibenzpyrenquinone with a quantity of bromine sufficient for introducing two bromine atoms, with 60 parts of α-aminoanthraquinone, 40 parts of sodium acetate and 3 parts of copper acetate in 800 parts of nitrobenzene, a dyestuff is obtained, which dissolves in concentrated sulfuric acid to a green solution and which dyes cotton from a red vat intense violet tints. It probably corresponds to the following formula:

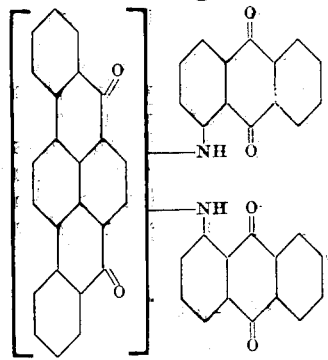

4. 25 parts of monochlor-3.4.8.9-dibenzpyrenquinone obtainable by causing benzylchloride to act upon 5-chlorbenzanthrone in the presence of aluminium chloride according to the process described in the U. S. Patent No. 1,564,584, dated December 8, 1925, in the name of Georg Kränzlein, Martin Corell and Robert Sedlmayr, are heated to boiling temperature for 18 hours with 30 parts phthalimide, 10 parts of sodium acetate and 2.5 parts of copper powder in 500 parts of nitrobenzene. The product is filtered cold by suction, washed with alcohol and subsequently with water. The phthalimidodibenzpyrenquinone of the following probable formula:

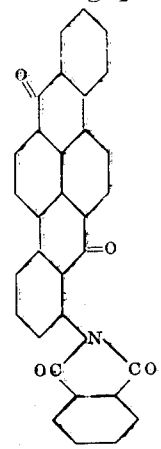

thus obtained dissolves in concentrated sulfuric acid to a blue solution.

By heating the said product with about ten times its weight of concentrated sulfuric acid to about 100° C. for half an hour, there is obtained by saponification the monoaminodibenzpyrenquinone which dissolves in concentrated sulfuric acid to a red solution and which dyes cotton from a red vat violet tints.

5. 94 parts of tetrachlordibenzpyrenquinone, obtained according to Example 1 of the German patent specification No. 430556, are heated in nitrobenzene with 180 parts of β-amino anthraquinone, sodium acetate and copper acetate. The product which is isolated as described in the preceding examples dyes from a violet-red vat brownish-black tints. The new dyestuff has the following probable formula:

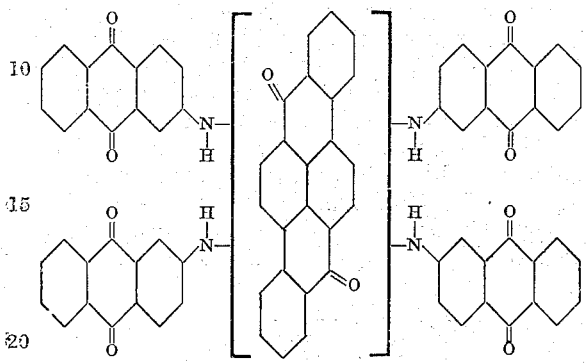

6. By condensing in the same manner tetrachlor dibenzpyrenquinone with α-amino-anthraquinone, a product of the probable formula:

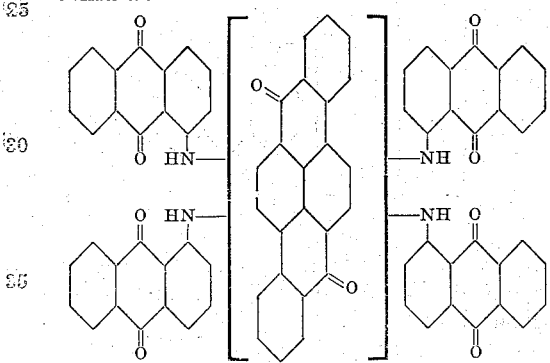

is obtained which dyes from a violet-red vat bluish-black tints. It dissolves in concentrated sulfuric acid to a red solution.

7. By condensing tetrachlordibenzpyrenquinone with anthranilic acid (1 mol.) in the manner described in Example 2, a dark green dyestuff of the following probable formula:

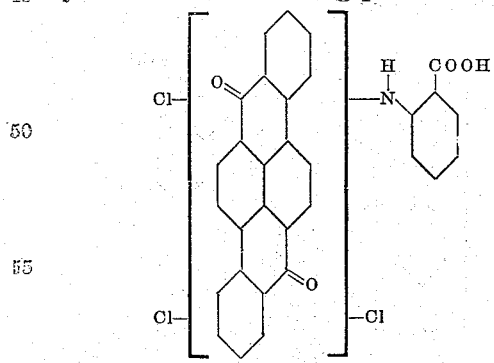

is obtained which dissolves in concentrated sulfuric acid to a violet-red solution and which yields from a violet vat pure-green dyeings.

By after-treating the dyestuff with a dehydrating agent, as for instance sodium-aluminium chloride or chlorosulfonic acid another dyestuff is obtained which dyes from a violet-red vat intense brown tints.

8. 100 parts of dibromisodibenzpyrenquinone, obtainable as indicated in Example 3, are heated to boiling temperature for 12 hours with 50 parts of benzamide, 20 parts of anhydrous sodium carbonate and 5 parts of copper acetate in 600 parts of nitrobenzene. The mass is filtered cold by suction and washed with alcohol and water. The dark-violet product thus obtained dissolves in concentrated sulfuric acid to a yellowish-green solution. The dyestuff dyes cotton from a reddish-orange vat violet tints. It probably corresponds to the following formula:

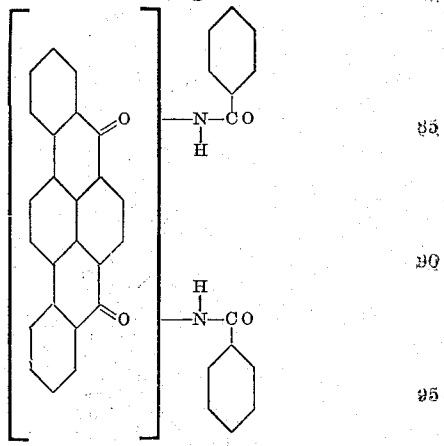

By treating in an analogous manner the monochlorodibenzpyrenquinone mentioned in Example 4, the monobenzoylamino derivative is obtained which dyes cotton clear and fast scarlet tints.

9. By fusing 10 parts of the bluish-black dyestuff obtained (according to Example 6) with 100 parts of sodium-aluminium chloride at a temperature of from 120° C. to 130° C. until the coloration of the fusion has turned from red to pure blue and afterwards working up the product, a dyestuff is obtained which dissolves in concentrated sulfuric acid to a pure blue solution and which dyes cotton from a violet vat an intense fast brown tint.

10. 24.5 parts of dibrom dibenzpyrenquinone of the following formula:

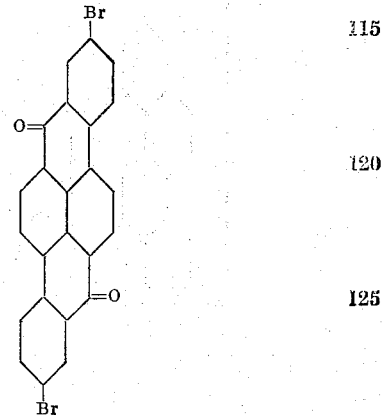

6.7 parts of 1-amino anthraquinone-2-carboxylic acid, 6 parts of sodium acetate and 5 parts of copper acetate are heated to boiling temperature in 300 ccm of nitrobenzene until the sparingly soluble reaction product has been separated. The dyestuff thus formed is filtered by suction at 100° C., washed with hot nitrobenzene and subsequently isolated in the usual manner. It has the following probable formula:

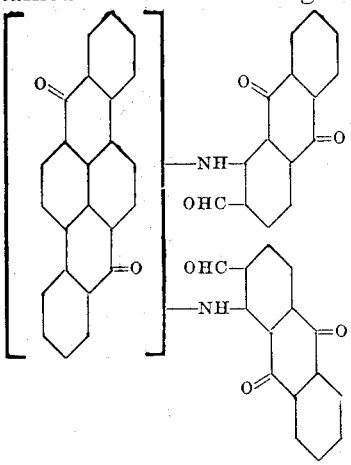

It dissolves in concentrated sulfuric acid to a red solution and dyes from a violet vat intense and fast olive-brown tints.

11. 24.5 parts of dibromdibenzpyrenquinone, 25 parts of 1-aminoanthraquinone-2-aldehyde, 6 parts of sodium acetate and 5 parts of copper acetate are heated to boiling temperature in 300 parts of nitrobenzene until the reaction is complete. The product is filtered by suction at 100° C., washed with hot nitrobenzene and isolated. The dyestuff thus obtained has the following formula:

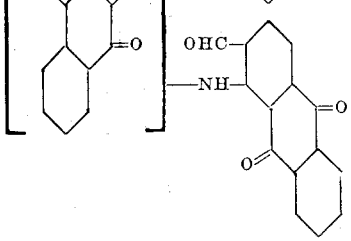

It dissolves in concentrated sulfuric acid to a pure red solution. It dyes from a violet-blue vat an intense reddish-brown tint.

12. 10 parts of dibromisodibenzpyrenquinone, 28 parts of 1-amino-4-benzoylaminoanthraquinone, 5 parts of sodium carbonate, 2 parts of sodium acetate and 3 parts of copper chloride are maintained at boiling temperature in 250 parts of naphthalene for 18 hours, poured hot into 1 liter of nitrobenzene, heated to 100° C., filtered by suction at about 80° C., washed with a small quantity of nitrobenzene, boiled out with xylene and isolated as usual. The dyestuff dissolves in concentrated sulfuric acid to a yellowish-green solution and dyes cotton from a brownish-red vat bluish-gray tints of good fastness properties. It probably has the following formula:

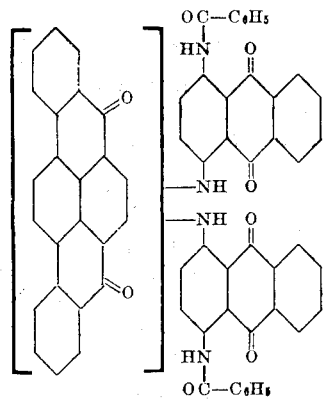

13. 10 parts of dibromisodibenzpyrenquinone, 28 parts of 1-amino-5-benzoylaminoanthraquinone, 5 parts of sodium acetate, 3 parts of copper acetate and 250 parts of naphthalene are heated to boiling temperature for about 1 hour. The dyestuff which is worked up as indicated in Example 12 dissolves in concentrated sulfuric acid to a pure green solution. It dyes cotton from an orange-red vat a gray tint of good fastness properties. The compound has the following probable formula:

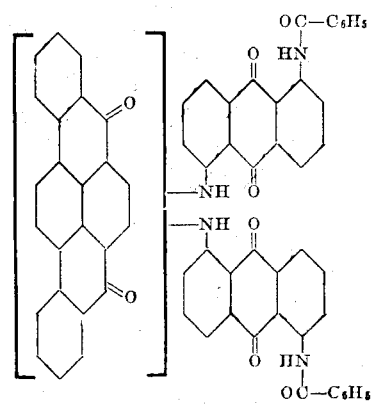

We claim:

1. The process which comprises heating at boiling temperature a compound having at least two bromine atoms in the molecule of the following formula:

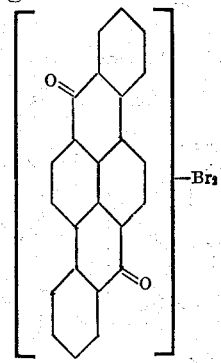

with a compound of the following formula:

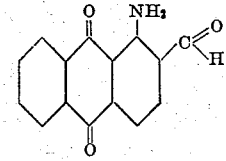

in the presence of nitrobenzene, sodium acetate and copper acetate.

2. The process which comprises heating a compound having at least one halogen atom in the molecule of the following formula:

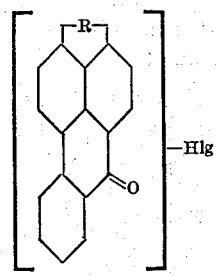

wherein R stands for the bivalent residue

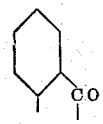

with a compound of the following formula: R₂—NH—R₁ wherein R₁ stands for hydrogen or a monovalent organic residue, R₂ for an aromatic residue which may be substituted or not or R₁ and R₂ together stand for the phthaloyl-residue, in the presence of nitrobenzene, sodium acetate and copper acetate and treating the resulting product with an acid condensing agent.

3. The process which comprises heating a compound having at least one halogen atom in the molecule of the following formula:

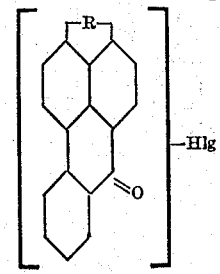

wherein R stands for the bivalent residue

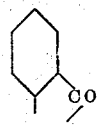

with a compound of the following formula:

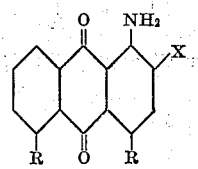

wherein X stands for hydrogen, the $C{<}^O_H$ or the $C{<}^O_{OH}$ group and R for hydrogen, or the NH.aroyl group, in the presence of nitrobenzene, sodium acetate and copper acetate and treating the resulting product with molten sodium-aluminium chloride.

4. The process which comprises heating a compound having at least one halogen atom in the molecule of the folowing formula:

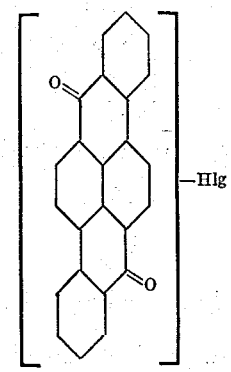

with a compound of the following formula: R₂—NH—R₁ wherein R₁ stands for hydrogen or a monovalent organic residue, R₂ stands for an aromatic residue which may be substituted or not or R₁ and R₂ together stand for phthaloyl-residue, in the presence of nitrobenzene, sodium acetate and copper acetate and subsequently treating the resulting product with an acid condensing agent.

5. The process which comprises heating a compound having at least one halogen atom in the molecule of the following formula:

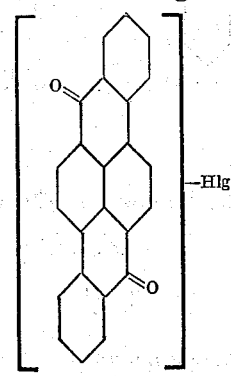

with a compound of the following formula:

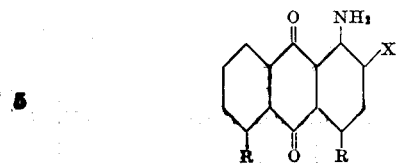

wherein X stands for hydrogen, the $C\!\!<\!\!^O_H$ or the $C\!\!<\!\!^O_{OH}$ group and R for hydrogen, or the NH.aroyl group, in the presence of nitrobenzene, sodium acetate and copper acetate and subsequently treating the resulting material with molten sodium-aluminium chloride.

6. As new products, compounds of the following general formula:

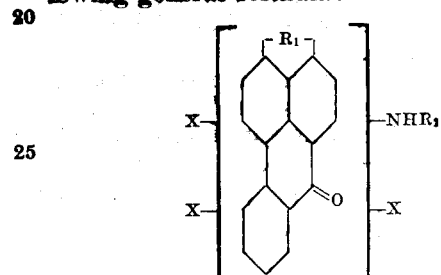

wherein $R_1$ stands for the bivalent residue

$R_2$ for aryl or aroyl and X for hydrogen or $NH.R_2$.

7. As new products, compounds of the following formula:

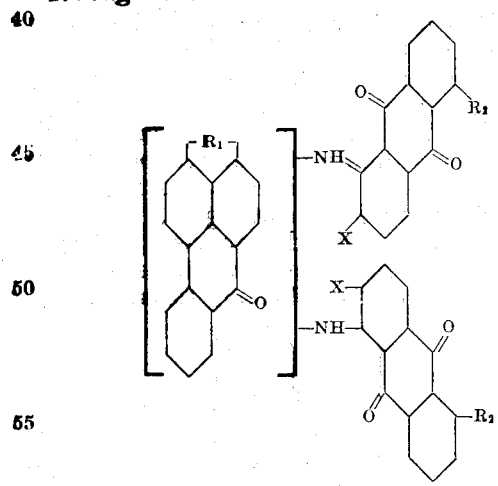

wherein $R_1$ stands for the bivalent residue

$R_2$ for hydrogen, group or NH.benzoyl, X for hydrogen, the COOH or the CHO group.

8. As new products, compounds of the following formula:

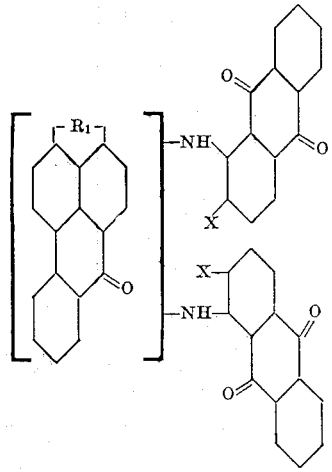

wherein $R_1$ stands for the bivalent residue

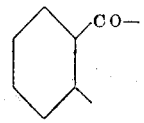

and X for hydrogen, the COOH or the CHO group.

9. As new products, compounds of the following formula:

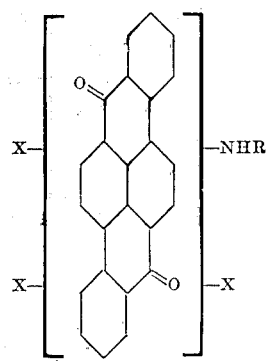

wherein R stands for aryl or aroyl and X stands for hydrogen or NH.R.

10. As new products, compounds of the following formula:

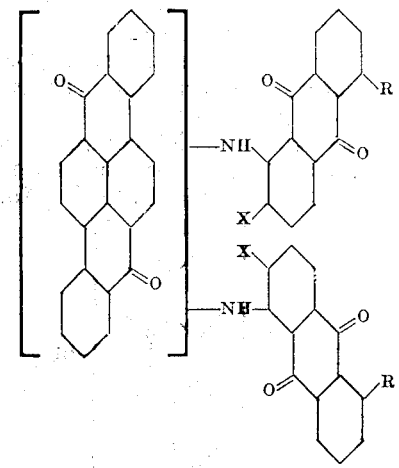

wherein R stands for, hydrogen or NH.benzoyl and X stands for hydrogen, the COOH or the CHO group.

11. As new products, compounds of the following formula:

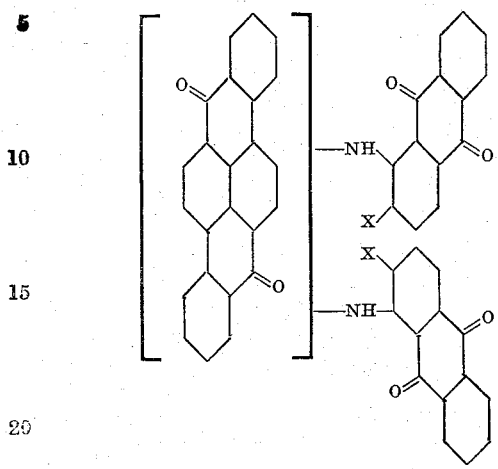

wherein X stands for the COOH or the CHO group.

12. As a new product, the dyestuff of the following formula:

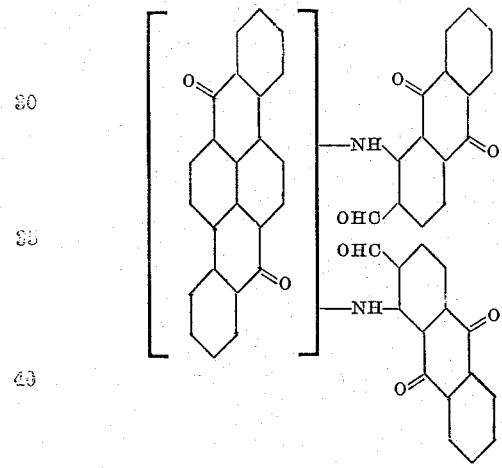

dissolving in concentrated sulfuric acid to a pure red solution and dyeing from a violet-blue vat an intense reddish-brown tint.

In testimony whereof, we affix our signatures.

GEORG KRÄNZLEIN.
HEINRICH VOLLMANN.
MARTIN CORELL.

CERTIFICATE OF CORRECTION.

Patent No. 1,825,740.             Granted October 6, 1931, to

GEORG KRÄNZLEIN ET AL.

It is hereby certified that error appears in the printed specification of the above numbered patent requiring correction as follows: Page 3, line 130, for the numeral "6.7" read 26.7; and that the said Letters Patent should be read with this correction therein that the same may conform to the record of the case in the Patent Office.

Signed and sealed this 16th day of February, A. D. 1932.

M. J. Moore,
Acting Commissioner of Patents.

(Seal)